US005939488A

United States Patent [19]

Nowicki et al.

[11] Patent Number: 5,939,488

[45] Date of Patent: Aug. 17, 1999

[54] FAST SETTING POLYURETHANE HOT MELT ADHESIVE COMPOSITION COMPRISING LOW HYDROXYL NUMBER/ HIGH MOLECULAR WEIGHT POLYESTER DIOLS

[75] Inventors: James W. Nowicki, Hopewell; Robert S. Wallach, Franklin Park, both of N.J.

[73] Assignee: National Starch and Chemical Investment Holding Corporation, Wilmington, Del.

[21] Appl. No.: 08/951,055

[22] Filed: Oct. 15, 1997

[51] Int. Cl.$^{6}$ ........................................ C08F 8/00

[52] U.S. Cl. .............................. 525/59; 525/83; 525/905; 525/440; 525/457; 36/19.5; 36/83; 156/325

[58] Field of Search ................................ 525/59, 83, 905, 525/440, 457; 36/19.5, 83; 156/325

[56] References Cited

U.S. PATENT DOCUMENTS

| | | | |
|---|---|---|---|
| 4,618,651 | 10/1986 | Gilch et al. | 525/130 |
| 4,946,535 | 8/1990 | Meckel et al. | 156/331.7 |
| 4,999,407 | 3/1991 | Gilch et al. | 525/457 |
| 5,019,638 | 5/1991 | Muller et al. | 528/83 |
| 5,110,892 | 5/1992 | Graham | 528/48 |
| 5,115,073 | 5/1992 | Meckel et al. | 528/83 |
| 5,162,457 | 11/1992 | Hansel et al. | 525/454 |
| 5,407,517 | 4/1995 | Hänsel et al. | 156/331.7 |
| 5,508,371 | 4/1996 | Werenicz et al. | 528/76 |
| 5,556,925 | 9/1996 | Kousaka et al. | 525/440 |
| 5,595,578 | 1/1997 | Stubbs et al. | 51/295 |
| 5,599,895 | 2/1997 | Heider | 528/59 |

FOREIGN PATENT DOCUMENTS

| | | | |
|---|---|---|---|
| 0 693 511 | 1/1996 | European Pat. Off. | C08G 18/76 |

OTHER PUBLICATIONS

Far Eastern Economic Review, The Post–National Economy, Goodbye widget, hello Nike, Aug. 29, 1996, p. 5.

*Primary Examiner*—James J. Seidleck
*Assistant Examiner*—Sanza McClendon
*Attorney, Agent, or Firm*—Lydia T. McNally

[57] ABSTRACT

The subject invention provides reactive hot melt adhesive compositions comprising polyurethane prepolymers which have an isocyanate index greater than one and which are prepared from a low hydroxyl number composition comprising high molecular weight polyester diols which have a relatively low melting point. These reactive hot melt adhesive compositions have a faster setting speed than conventional reactive hot melt adhesive compositions. The subject invention also provides a method for bonding articles together which uses such reactive hot melt adhesive compositions and articles which comprise the reactive hot melt adhesive compositions.

20 Claims, No Drawings

FAST SETTING POLYURETHANE HOT MELT ADHESIVE COMPOSITION COMPRISING LOW HYDROXYL NUMBER/ HIGH MOLECULAR WEIGHT POLYESTER DIOLS

BACKGROUND OF THE INVENTION

Reactive hot melt adhesives ("reactive hot melts") are comprised of isocyanate-terminated polyurethane polymers, often referred to as "prepolymers", that react with surface or ambient moisture in order to chain-extend and form a second polyurethane polymer. Reactive hot melt adhesives are also known as "polyurethane hot melt adhesives".

Unlike conventional hot melt adhesives, which can be heated to a liquid state and cooled to a solid state repeatedly, a reactive hot melt undergoes an irreversible chemical reaction to a solid "cured" form once dispensed in the presence of ambient moisture. Reactive hot melts are therefore useful for applications which are exposed to high temperatures; an article adhered with a conventional hot melt would become unglued if exposed to high temperatures which would cause the conventional hot melt adhesive to melt to a liquid state. Articles for which reactive hot melts are particularly useful as adhesives include architectural components on building exteriors and components of recreational vehicles, such as cars and vans.

Reactive hot melts will bond to a variety of substrates including plastics, woods, fabrics and metals, making them ideal candidates for bonding dissimilar substrates. They are flexible and durable by nature, and may be used in extreme temperature ranges of −30 degrees up to about +150 degrees Celsius, while providing excellent moisture and chemical resistance.

With a reactive hot melt adhesive, the bond between two substrates is initially made by the strength of the solid form of the adhesive after it has cooled from a liquid form, which typically occurs after a period of seconds after the adhesive is dispensed in liquid form. This initial bond holds the two substrates together until the solid adhesive cures to its most durable, irreversibly-solid form, which takes place in the presence of moisture, typically after a period of hours, or even days.

Certain applications benefit from fast setting adhesives, that is adhesives which convert quickly from liquid melt to solid state once applied. For example, a high-speed continuous adhesion process often requires that a bond between two sheet-like components (such as between a laminate or veneer and a solid core) be made quickly as the bonded components are extruded from a roller. Thus, various measures have been taken to shorten the setting speed of reactive hot melt adhesives, that is to decrease the amount of time it takes for a reactive hot melt to convert from liquid to solid state.

Meckel et al. (U.S. Pat. No. 5,115,073, Date of Patent May 19, 1992), for example, teach polyurethane systems which are prepared by reacting, inter alia, polyester diols, such as dodecane diol, which have a melting point of 65 degrees Celsius to 150 degrees Celsius (preferably from 70 degrees to 145 degrees Celsius). Systems prepared from these relatively high melting point polyester diols taught by Meckel et al. crystallize at the polyester diol melting point and thus set quicker than conventional reactive hot melt adhesives.

Müller et al. (U.S. Pat. No. 5,019,638, Date of Patent May 28, 1991) disclose a broad range of aliphatic hydroxypolyesters for preparing rapidly setting reactive hot melt adhesives. Müller et al. describe the hydroxypolyesters as being prepared from dicarboxylic acids with 8, 10 or 12 methylene groups and diols with 6 to 12 methylene groups. Müller et al., do not disclose the significance of using a low hydroxyl number composition of polyester diols to achieve fast setting reactive hot melt adhesives.

SUMMARY OF THE INVENTION

We have discovered that when low hydroxyl number/high molecular weight polyester diols are incorporated into a reactive hot melt prepolymer, the setting speed of the reactive hot melt adhesive is faster. We have found this to be true although the melting points of the polyester diols we tested are less than 65 degrees Celsius. Thus, our invention provides a fast setting reactive hot melt adhesive without using high melting point ingredients, such as the relatively costly dodecane dioate polyester disclosed by Meckel et al., supra, and Müller et al., supra.

Accordingly, this invention provides a reactive hot melt adhesive composition consisting essentially of polyurethane prepolymers which have an isocyanate index greater than one and which are prepared by reacting a) a low hydroxyl number composition comprising high molecular weight polyester diols which have a melting point of less than 65 degrees Celsius; with b) a compound which contains two or more isocyanate groups.

DETAILED DESCRIPTION OF THE INVENTION

This invention provides a reactive hot melt adhesive composition comprising polyurethane prepolymers which have an isocyanate index greater than one and which are prepared by reacting a) a low hydroxyl number composition comprising high molecular weight polyester diols which have a melting point of less than 65 degrees Celsius; with b) a compound which contains two or more isocyanate groups. The compositions of this invention offer faster setting speed, without the use of expensive ingredients, such as dodecane dioate polyester, of the prior art.

As used herein, the term "setting speed" refers to the time required for a hot melt adhesive to convert from its liquid melt state to its solid, yet uncured, state. In one embodiment, a composition according to this invention has a setting speed of less than about 30 seconds. In another embodiment, a composition according to this invention has a setting speed of about 25 seconds or less.

The isocyanate index of any polyurethane prepolymer of this invention is greater than one. For purposes of this invention, the term "isocyanate index" has the same meaning as the meaning conventionally known in the art. An isocyanate index of three, for example, means that there are three isocyanate moieties produced for each reactant hydroxyl moiety consumed in the preparation of the polyurethane prepolymer composition. Thus, if the isocyanate index is greater than one, all of the reactant hydroxyl moieties have been consumed in preparing the polyurethane prepolymers. Preferably, the polyurethane prepolymers of this invention have an isocyanate index between one and about six.

Polyester diol compositions for the low hydroxyl number composition (a) of high molecular weight polyester diols are prepared by combining a dicarboxylic acid with a suitable amount of a diol. The reaction scheme typically is as follows:

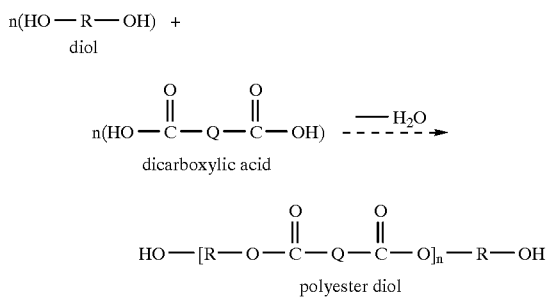

R and Q are independent of one another and are branched or straight-chain alkylene groups. The resulting polyester diol is comprised of n repeating units, where n is any number, so long as the molecular weight of the polyester diol is sufficiently high. Preferably, R has from four to eight carbon atoms and Q has from two to seven carbon atoms. Thus, preferred polyester diols according to this invention consist essentially of polyester diol units which have from four to eight carbon atoms and dicarboxylic acid units which have from four to nine carbon atoms. Adipic acid, i.e. a dicarboxylic acid wherein Q is butyl, is especially preferred as dicarboxylic acid for forming the polyester diols for this invention. In one embodiment, the polyester diols in (a) are hexanediol adipate polymers. In another embodiment, the polyester diols in (a) are butanediol adipate polymers. In a further embodiment, the polyester diols in (a) are pentanediol adipate polymers. The composition of (a) may be a mixture of different polyester diols, for example a mixture of two or more of any of the aforementioned polyester diols.

The melting points of the polyester diols of (a) are less than 65 degrees Celsius, for example less than about 64 degrees Celsius. In one embodiment, the melting points of the polyester diols of (a) are less than about 60 degrees Celsius.

The composition in (a) of high molecular weight polyester diols may be prepared by reacting, as shown above, a diol with a dicarboxylic acid in proportions suitable for obtaining high molecular weight polyester diols. The resulting composition (containing high molecular weight polyester diols) will concomitantly contain a low number of hydroxyl moieties. In other words, the molecular weights of the polyester diols in the composition and the number of hydroxyl moieties in the composition are inversely related: the higher the molecular weights of the polyester diols, the lower the number of hydroxyl moieties in the composition. Preferably, polyester diols for the subject invention have a molecular weight greater than or equal to about 4000, especially from about 4000 to about 11,000, most especially from about 5600 to about 11,000.

The concentration of hydroxyl moieties in a composition of polymers is typically assessed by determining a "hydroxyl number" for the composition. This assessment is well known to those in the art. A hydroxyl number represents mg KOH/g of polyol. A hydroxyl number is determined by acetylation with pyridine and acetic anhydride in which the result is obtained as the difference between two titrations with KOH solution. A hydroxyl number may thus be defined as the weight of KOH in milligrams that will neutralize the acetic anhydride capable of combining by acetylation with 1 gram of a polyol. A higher hydroxyl number indicates a higher concentration of hydroxyl moieties within a composition. For purposes of this invention, the term "hydroxyl number" means a value which has been determined according to this well-known titration method. A description of how to determine the hydroxyl number for a composition can be found in texts well-known in the art, for example in Woods, G., The ICI Polyurethanes Book—2nd ed. (ICI Polyurethanes, Netherlands, 1990). In one embodiment, the hydroxyl number of the composition in (a) is less than about 30. Preferably, the hydroxyl number is less than about 20, for example between about 10 and about 15. Compositions having a hydroxyl number from about 10 to about 20 are comprised of polymers which have molecular weights of from about 5600 to about 11,000, which is mentioned above as a preferred molecular weight range for polyester diols useful for this invention.

The amounts of diol and dicarboxylic acid which are to be combined to form a low hydroxyl number polyester diol composition for (a) may be determined using methods known to those of ordinary skill in the art. Generally, a slight excess of diol compared to dicarboxylic acid is used. The reaction can occur as shown above, the molecular weight/hydroxyl number of the polyester diol produced being a function of the quantity of water removed, as is known in the art. Water may be removed by distilling the reactants.

Any suitable compound which contains two or more isocyanate groups may be used in (b) for preparing the prepolymers of the subject reactive hot melt adhesive composition. Examples of suitable isocyanate-containing compounds include, but are not limited to, ethylene diisocyanate, ethylidene diisocyanate, propylene diisocyanate, butylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenylmethane-2,2',5,5-tetraisocyanate, and the like. Sources for such compounds and methods for synthesizing such compounds are well-known in the art. In one embodiment, the compound in (b) is a diisocyanate. Preferred isocyanate-containing compounds are methylenebisphenyidiisocyanate (MDI) and isophoronediisocyanate (IPDI).

The isocyanate-containing compound of (b) and the composition of polyester diols of (a) are combined in proportions so as to yield a urethane prepolymer which has an isocyanate index greater than one. Suitable proportions of (b) and (a) may be determined according to known methods, such as by calculating, from the hydroxyl number of the reactant polyester diol and the isocyanate functionality (%NCO or NCO#) of the reactant compound containing two or more isocyanate groups, the equivalent weights of (a) and (b) required to achieve an isocyanate index of greater than one. A typical reaction scheme for synthesizing the polyurethane prepolymers for this invention is as follows:

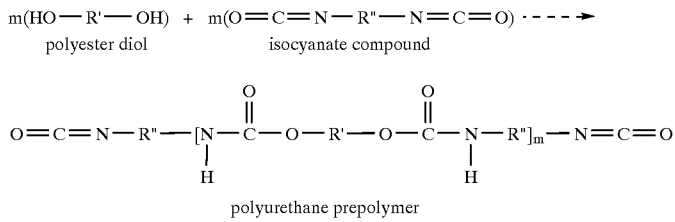

polyester diol + isocyanate compound → polyurethane prepolymer

The isocyanate-containing compound of (b) and the composition of polyester diols of (a) are combined to form a prepolymer by mixing, and allowing (b) and (a) to react. The reaction should occur at a temperature of about 100 degrees Celsius, for a period of about two hours.

If desired, the reactive hot melt adhesive composition of this invention may be formulated with one or more conventional additives which are compatible with the composition. Conventional additives include, but are not limited to, plasticizers, tackifiers, pigments, and stabilizers such as anti-oxidants. Conventional additives which are compatible with a composition according to this invention may simply be determined by combining a potential additive with the composition and determining if they are compatible. An additive is compatible if it is homogenous within the product.

This invention also provides a method for bonding articles together which comprises applying the subject reactive hot melt adhesive composition in a liquid melt form to a first article, bringing a second article in contact with the composition applied to the first article, and subjecting the applied composition to conditions which will allow the composition to cool and cure to a composition having an irreversible solid form, said conditions comprising moisture.

The solid (uncured) hot melt adhesive composition melts above room temperature, at a temperature of about 50 degrees Celsius. The composition is, however, actually generally applied at a temperature of about 120 degrees Celsius. The composition is typically distributed and stored in its solid form. The composition should be stored in the absence of moisture. When the composition is ready for use, the solid is heated and melted prior to application. Thus, this invention includes the subject composition of polyurethane prepolymers as described in the claims of this application in both its solid form, as it is typically to be stored and distributed, and its liquid form, after it has been melted, just prior to its application.

Methods for applying the subject liquid melt composition are known in the art and include, but are not limited to, roll coating, spraying, and extrusion.

After application, to adhere articles together, the reactive hot melt adhesive composition is subjected to conditions which will allow it to solidify and cure to a composition which has an irreversible solid form. Solidification (setting) occurs if the liquid melt is subjected to room temperature in approximately less than about 30 seconds. Curing, i.e. chain extending, to a composition which has a irreversible solid form, takes place in the presence of ambient moisture and is complete between about four hours and about seventy-two hours, in general after approximately twenty-four hours. The reaction scheme for curing the subject hot melt adhesive composition of polyurethane prepolymers with moisture is as follows:

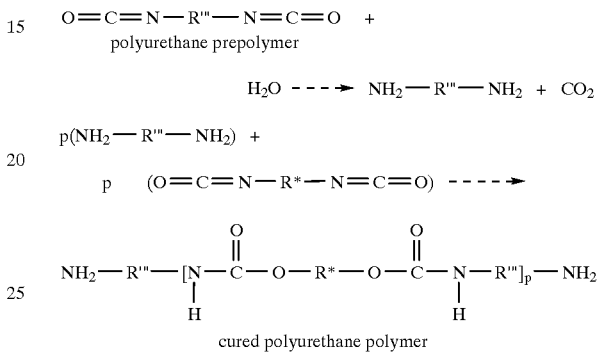

As used herein, "irreversible solid form" means a solid form comprising polyurethane polymers extended from the aforementioned polyurethane prepolymers. The composition having the irreversible solid form typically can withstand temperatures of up to 150 degrees Celsius.

The subject invention also encompasses compositions which result from curing the subject composition of polyurethane prepolymers.

The subject hot melt adhesive composition is useful for bonding articles composed of a wide variety of substrates (materials), including, but not limited to wood, aluminum, and glass. The subject compositions are particularly useful for bonding articles, such as architectural panels and components on the exteriors of vehicles, which may be subjected to weather such as heat or rain. Because they are fast setting, the subject compositions are more particularly useful for bonding long sheets of substrates together in a high-speed, continuous bonding process. Thus, our invention also includes articles which have been bound using the subject hot melt adhesive composition. More generally, our invention encompasses any article which comprises the subject hot melt adhesive composition and any article which comprises a composition which results from curing the subject hot melt adhesive composition.

The reactive hot melt adhesives of the present invention are suitable for use in the shoe industry. As used herein, "shoes" shall include outer footwear and any intermediates in the preparation of such shoes or outer footwear. Specifically, these adhesives can be used to bond together various parts of shoes such as the outsole to the midsole, midsole to upper material, and outsole to upper material. In addition, the subject adhesives can be used to bond other devices to any of the aforementioned parts of shoes and can be used for leather bonding. This bonding of the various parts, of the parts to other devices, or leather bonding will be familiar to those of skill in the shoe manufacturing industry. For example, the adhesive can be applied to one or both parts to be bonded by slot extrusion, atomized spray or spiral spray followed by interlocking the parts with pressure.

The following examples are merely provided to help illustrate the subject invention, and are not intended to, and should not in any way be construed to, limit the subject invention as defined in the claims of this application.

EXAMPLES

EXAMPLE 1

The following compositions were prepared from MDI, Dynacol 7360 (30 OH# hexanediol adipate, Huls America) and Ruco S105-10 (14 OH# hexanediol adipate, Ruco Polymer Corporation, Hicksville, New York) in the amounts shown. For each composition, the bond range and tack free were determined.

Bond range was determined as follows: 4 ml film was pulled on kraft paper; test composition was applied, and pine veneer attached and compressed with a roller in 10 second intervals. The amount of time after which the applied composition loses its bonding ability (the bond range) and becomes tack free to touch (tack free) were determined. Bond range and tack free show the setting speed (i.e. the time required for solidification) of each composition.

Composition A
  Dynacol 7360, 120.0 grams
  Ruco S105-10, 51.0 grams
  MDI, 29.0 grams
Composition B
  Dynacol 7360, 69.0 grams
  Ruco S105-10, 104.0 grams
  MDI, 27.0 grams
Composition C
  Dynacol 7360, 352.0 grams
  MDI, 48.0 grams
Composition D
  Dynacol 7360, 360.0 grams
  MDI, 40.0 grams

| Comp. | OH#@ | % NCO* | % NCO@ | Viscosity | Bond Range | Tack Free |
|---|---|---|---|---|---|---|
| A | 25 | 3.1 | 2.75 | 6,500 | 30–35 sec | 40 sec |
| B | 20 | 3.1 | 3.38 | 12,500 | 15–20 sec | 20 sec |
| C | 30 | 2.1 | 1.93 | 7,375 | 50–55 sec | 55 sec |
| D | 30 | 1.3 | 1.58 | 20,250 | 55–60 sec | 65 sec |

*Theoretical
@Measured value

OH# was measured for each composition by ASTM (The American Society of Testing Methods) E222-67. The theoretical %NCO was calculated from the molecular weights and the amounts of the reactants used to synthesize the polyurethanes. The %NCO was measured for each composition by ASTM D2572. Theoretical OH# may be calculated for a composition from the molecular weights and amounts of reactants used to synthesize the polyurethane prepolymers. Viscosity was measured at 250 degrees Fahrenheit and is given in centipoises (cps). Viscosity was measured by Brookfield thermocell viscometer.

The isocyanate index (NCO:OH) of Compositions A-D is as follows:

| Composition | Isocyanate Index |
|---|---|
| A | 3.02 |
| B | 3.44 |
| C | 2.04 |
| D | 1.66 |

EXAMPLE II

Compositions were prepared as set forth in the following Table. %NCO, OH#, viscosity, bond range, and tack free were measured as described in Example I, above. HDA stands for hexanediol adipate.

TABLE

| Composition | 1 | 2 | 3 | 4 | 5 | 6 | 7 |
|---|---|---|---|---|---|---|---|
| HDA (60 OH#) | 84.5 | 80 | 41 | | | | 33.5 |
| HDA (30 OH#) | | | 41 | 84.5 | | | 33.5 |
| HDA (14 OH#) | | | | | 84.5 | 88 | |
| Dodecane Dioate Polyester (30 OH#) | | | | | | | 15 |
| MDI | 15.5 | 20 | 18 | 15.5 | 15.5 | 12 | 18 |
| % NCO | 1.4 | 3.1 | 3.0 | 3.1 | 4.3 | 3.1 | 2.5 |

The melting points of the diols used in the above compositions 1–7 as obtained by differential scanning calorimetry is as follows:

| Diol | Melting Point (degrees Celsius) |
|---|---|
| HDA (60 OH#) | 46.6 |
| HDA (30 OH#) | 49.6 |
| HDA (14 0H#) | 52.5 |
| Dodecane dioate polyester (30 OH#) | 64.7 |

The isocyanate index (NCO:OH) of Compositions 1–7 is as follows:

| Composition | Isocyanate Index |
|---|---|
| 1 | 1.37 |
| 2 | 1.87 |
| 3 | 2.19 |
| 4 | 2.74 |
| 5 | 5.88 |
| 6 | 4.37 |
| 7 | 2.33 |

The results are as follows:

| Composition | Visc. @ 250F | Bond Range | Tack Free |
|---|---|---|---|
| 1 | 50,000 | >3 min | >3 min |
| 2 | 3,800 | >3 min | >3 min |
| 3 | 4,375 | 95 sec | 105 sec |
| 4 | 3,525 | 30 sec | 35 sec |
| 5 | 20,800 | 25 sec | 30 sec |
| 6 | 31,200 | 25 sec | 30 sec |
| 7 | 2,250 | 25 sec | 30 sec |

Compositions 5 and 6, which contain low hydroxyl number hexanediol adipate, have a setting time which is as fast as Composition 7. Composition 7, however, contains dodecane dioate polyester, which is relatively costly. The setting time of Compositions 5 and 6 is as fast as Composition 7 even though the melting point of HDA (14 OH#) is only 52.5 degrees Celsius, compared to the 64.7 degrees Celsius melting point of the dodecane dioate polyester (30 OH#).

Compositions 1 and 4 contain higher hydroxyl number hexanediol adipates (60 and 30, respectively) than Composition 5 (which has a hydroxyl number of 14). The amount of MDI was the same for all three compositions. Compositions 1 and 4 have a longer setting time than Composition 5.

Compositions 2 and 3 likewise contain higher hydroxyl number hexanediol adipates than Composition 6. (Composition 2 contains a hexanediol adipate with a hydroxyl number of 60; Composition 3 contains a mixture of hexanediol adipates of different hydroxyl numbers which, when averaged, amount to a hexanediol adipate polymer composition with a hydroxyl number of 45; Composition 6 contains a hexanediol adipate which has a hydroxyl number of 14.) The %NCO was the same for Compositions 2, 3, and 6. Composition 6 has a faster setting speed than Composition 2 or Composition 3.

Thus, holding either the amount of polyisocyanate constant or the %NCO constant, the setting speed is faster when polyurethane prepolymer compositions comprise lower hydroxyl number polyester diols.

EXAMPLE III

The following compositions can be prepared from MDI and butanediol adipates of low OH# according to our invention:
Composition 8
  Butanediol adipate (25 OH#), 172.0 grams
  MDI, 28 grams
Composition 9
  Butanediol adipate (10 OH#), 178.0 grams
  MDI, 22 grams
The OH#, %NCO, and isocyanate index for each composition would be as follows:

| Composition | OH# | % NCO | Isocyanate Index |
|---|---|---|---|
| 8 | 25 | 3.1 | 2.92 |
| 9 | 10 | 3.0 | 5.55 |

EXAMPLE IV

The following compositions can be prepared from MDI and pentanediol adipates of low OH# according to the subject invention:
Composition 10
  Pentanediol adipate (25 OH#), 172.0 grams
  MDI, 28 grams
Composition 11
  Pentanediol adipate (10 OH#), 178.0 grams
  MDI, 22 grams
The OH#, %NCO, and isocyanate index for each composition would be as follows:

| Composition | OH# | % NCO | Isocyanate Index |
|---|---|---|---|
| 10 | 25 | 3.1 | 2.92 |
| 11 | 10 | 3.0 | 5.55 |

We claim:

1. A reactive hot melt adhesive composition consisting essentially of polyurethane prepolymers which have an isocyanate index greater than one and which are prepared by reacting a) a low hydroxyl number composition comprising high molecular weight polyester diols which have a melting point of less than 65 degrees Celsius; with
   b) a compound which contains two or more isocyanate groups,
   wherein the polyester diols in (a) are selected from the group consisting of hexanediol adipate polymers, butanediol adipate polymers, pentanediol adipate polymers, and combinations thereof.

2. A reactive hot melt adhesive composition according to claim 1, wherein the hydroxyl number of the polyester diol composition in (a) is less than about 30.

3. A reactive hot melt adhesive composition according to claim 2, wherein the hydroxyl number of the polyester diol composition in (a) is less than about 20.

4. A reactive hot melt adhesive composition according to claim 3, wherein the hydroxyl number of the polyester diol composition in (a) is between about 10 and about 15.

5. A reactive hot melt adhesive composition according to claim 1, wherein the polyester diols in (a) consist essentially of diol units which have from four to eight carbon atoms.

6. A reactive hot melt adhesive composition according to claim 1, wherein the polyester diols in (a) consist essentially of dicarboxylic acid units which have from four to nine carbon atoms.

7. A reactive hot melt adhesive composition according to claim 1, wherein the compound in (b) is a diisocyanate.

8. A reactive hot melt adhesive composition according to claim 7, wherein the diisocyanate is selected from the group consisting of methylenebis-phenyldiisocyanate and isophoronediisocyanate.

9. A reactive hot melt adhesive composition according to claim 1, wherein the polyurethane prepolymers have an isocyanate index between one and about six.

10. A reactive hot melt adhesive composition according to claim 1, further comprising one or more additives selected from the group consisting of plasticizers, tackifiers, pigments, and stabilizers.

11. A reactive hot melt adhesive composition according to claim 1, in a liquid melt form.

12. A reactive hot melt adhesive composition according to claim 1, in a solid form.

13. A composition prepared by curing a reactive hot melt adhesive composition according to claim 1.

14. A method for bonding articles together which comprises applying a reactive hot melt adhesive composition according to claim 1 in a liquid form to a first article, bringing a second article in contact with the composition applied to the first article, and subjecting the applied composition to conditions which will allow the composition to cool and cure to a composition having an irreversible solid form, said conditions comprising moisture.

15. An article comprising a reactive hot melt adhesive composition according to claim 1 in a solid form.

16. An article which comprises a composition which has been prepared by curing a composition according to claim 1.

17. A shoe comprising a reactive hot melt adhesive composition according to claim 1.

18. A shoe comprising shoe parts that have been bonded with a reactive hot melt adhesive composition according to claim 1.

19. A shoe according to claim 18 wherein the parts are an outsole, a midsole and an upper material.

20. A shoe in which shoe parts are bonded to a device with a reactive hot melt adhesive composition according to claim 1.

* * * * *